United States Patent
Niwa et al.

[11] Patent Number: 6,101,431
[45] Date of Patent: Aug. 8, 2000

[54] FLIGHT SYSTEM AND SYSTEM FOR FORMING VIRTUAL IMAGES FOR AIRCRAFT

[75] Inventors: Yoshiyuki Niwa, Tachikawa; Shunichi Bandoh, Kakamigahara; Ryutaro Yabe, Kakamigahara; Hiroki Nishimura, Kakamigahara; Mikio Terashima, Nishikasugai-Gun; Sumio Sako, Minokamo, all of Japan

[73] Assignees: Kawasaki Jukogyo Kabushiki Kaisha, Kobe; Japan Defence Agency, Japanese Government, Tokyo, both of Japan

[21] Appl. No.: 09/137,748

[22] Filed: Aug. 21, 1998

[30] Foreign Application Priority Data

Aug. 28, 1997 [JP] Japan .................................. 9-232688

[51] Int. Cl.<sup>7</sup> ............................ G01C 21/00; B64D 45/00
[52] U.S. Cl. ................................... 701/14; 345/8; 345/9; 340/980
[58] Field of Search ........................ 701/3, 14; 348/113, 348/115, 117; 340/980; 345/7, 8, 9; 359/13

[56] References Cited

U.S. PATENT DOCUMENTS

| | | | |
|---|---|---|---|
| 3,897,150 | 7/1975 | Bridges et al. | 356/5.04 |
| 4,900,133 | 2/1990 | Berman | 349/11 |
| 5,072,218 | 12/1991 | Spero et al. | 340/980 |
| 5,184,231 | 2/1993 | Ellis | 359/13 |
| 5,210,586 | 5/1993 | Grage et al. | 356/5.01 |
| 5,296,854 | 3/1994 | Hamilton et al. . | |
| 5,491,510 | 2/1996 | Gove | 348/77 |
| 5,555,175 | 9/1996 | D'orso | 701/5 |
| 5,566,073 | 10/1996 | Margolin | 701/213 |
| 5,815,411 | 9/1998 | Ellenby et al. | 702/150 |
| 5,838,262 | 11/1998 | Kershner et al. | 340/945 |

*Primary Examiner*—Michael J. Zanelli
*Attorney, Agent, or Firm*—Oliff & Berridge, PLC

[57] ABSTRACT

A three-dimensional digital map prepared by an satellite or the like is stored in a first memory as a wide-area information. Narrow-area information obtained by a laser radar is stored in a second memory. Obstacle information on obstacles, such as high-voltage power lines, high buildings and cranes, is stored in a third memory. These three information are read out to generate virtual images on a see-through type display mounted on a helmet of a pilot so that the virtual images is superimposed on the actual field of vision.

12 Claims, 10 Drawing Sheets

FIG. 5(a) THREE-DIMENSIONAL MAP

FIG. 5(b) AERIAL PHOTOGRAPH

FIG. 5(c) WIDE-AREA MAP INFORMATION

FLIGHT SYSTEM AND SYSTEM FOR FORMING VIRTUAL IMAGES FOR AIRCRAFT

BACKGROUND OF THE INVENTION

1. Field of the Invention

The present invention relates generally to a flight system and a system for forming virtual images for an aircraft. More specifically, the invention relates to a system for providing the virtual images, which is artificially generated, to a pilot in order to facilitate the operation of a rotor craft or a light fixed wing aircraft.

2. Description of the Prior Art

Currently, rotor crafts, such as helicopters, are widely used for saving a life in the sea or a mountainous area, for transporting an emergency patient, for transporting goods to a mountain hut and so forth in all over the world.

The rotor crafts have advantages of requiring only a small area for takeoff and landing and of being capable of hovering, so that the rotor craft is an ideal transportation, which can fly anywhere anytime in theory. However, there is a problem in that the rotor crafts can not fly even in slightly bad weather, such as a fog and a light rain. In addition, recently, the rotor crafts are scarcely used for transporting persons although there are some experimental operation cases as rotor crafts on company business. Moreover, the rotor crafts can not fly when it is raining lightly.

The reasons why the reliability of such a rotor crafts are low, are the following reasons (1) through (5).

Figure 11:
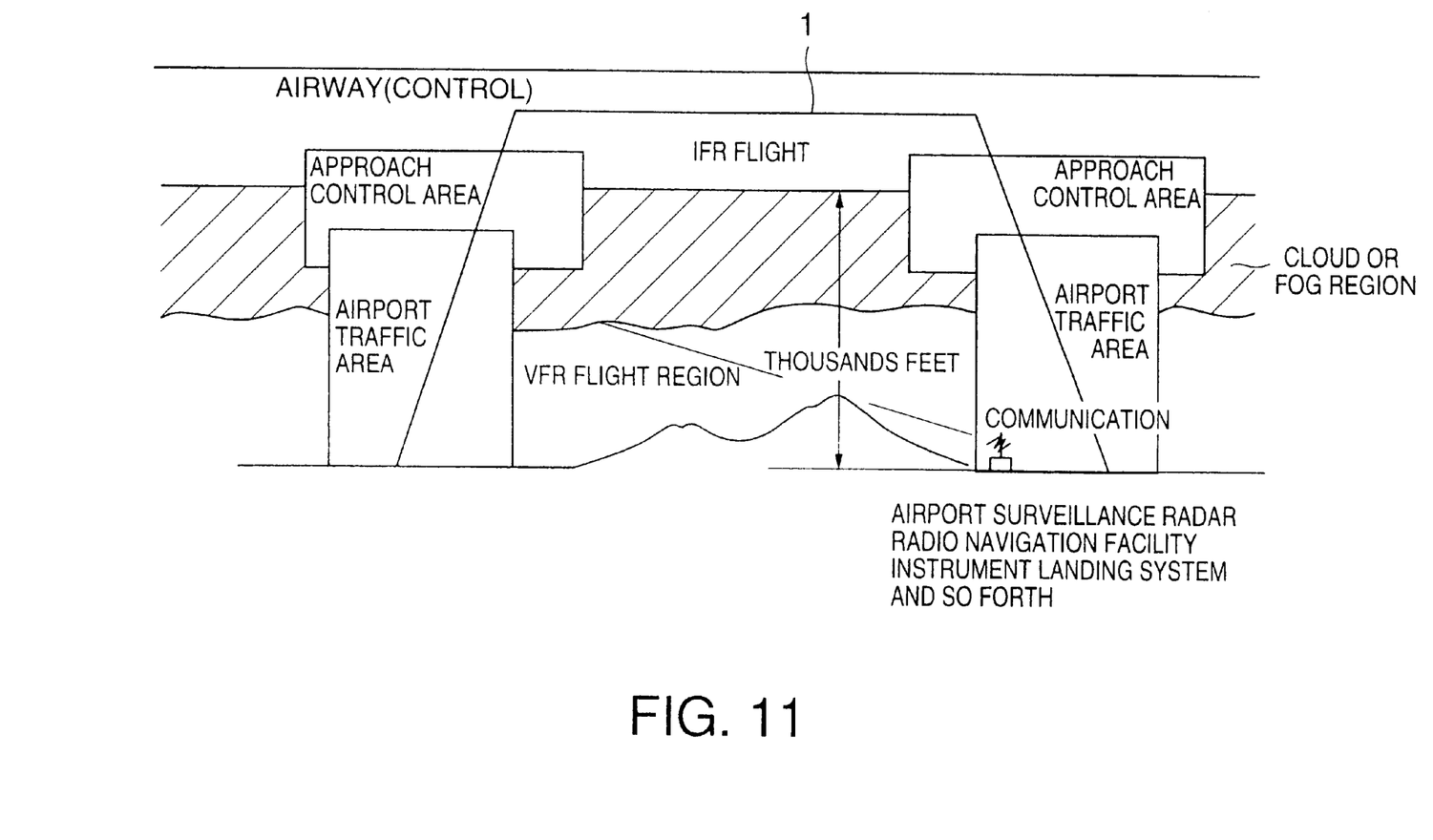
FIG. 11 is a schematic view for explaining the instrument flight rules (IFR) and the visual flight rules (VFR)

(1) As shown in FIG. 11, there are some cases where the instrument flight rules (which will be hereinafter referred to as "IFR") can not be utilized. In the IFR, a radio guidance system, such as a radar, utilizes an inertial navigation system to allow an aircraft to fly in accordance with the direction of an air traffic controller so that the aircraft can fly when there is no visibility. The control policy is to insure safety by assigning an exclusive space to the respective aircraft. Since the respective aircraft is in duty bound to fly in the assigned space, the flight path 1 can not be suitably changed. Moreover, since automatic landing gears have been developed, an aircraft can take off and land unless it is considerably bad weather. Therefore, a scheduled service using a supercarrier equipped with such a landing gear has been accomplished a high on time departure rate of 98% or more. This is provided mainly for purpose of supporting the operation of a large fixed wing aircraft, and such an aircraft is in duty bound to fly via the sky of radio marks provided in a flight route.

However, the rules of FIG. 11 can not be utilized when the rotor crafts freely fly to utilize a heliport being one of a great many heliports, which are located in every place and which have no radio mark. In addition, the rules of FIG. 11 can not be utilized in an extra heliport for disaster and emergency.

(2) Moreover, radar waves for the IFR can be utilized for only places near large airports having radars. In addition, when the rotor crafts fly at a low altitude, there are some cases where the radar waves for the IFR can not utilized even near large airports since the radar waves are blocked by mountains. Therefore, the rotor craft often flies in accordance with the visual flight rules (VFR).

(3) Since the VFR needs severe conditions for weather, particularly for visibility, the rotor crafts are difficult to fly in the fog, rain and night, and the on time departure rate is relatively low, for example a level of 60%. These are the reasons why helicopters are not widely used. This has become a serious problem common to regular service as well as lifesaving, disaster support and so forth.

(4) The IFR is clearly distinguished from the VFR. However, actual weather changes in accordance with time, regions, altitude and so forth. For example, even if the VER allows a flight, weather often gets worse to approach to the instrument flight conditions.

Figure 12:
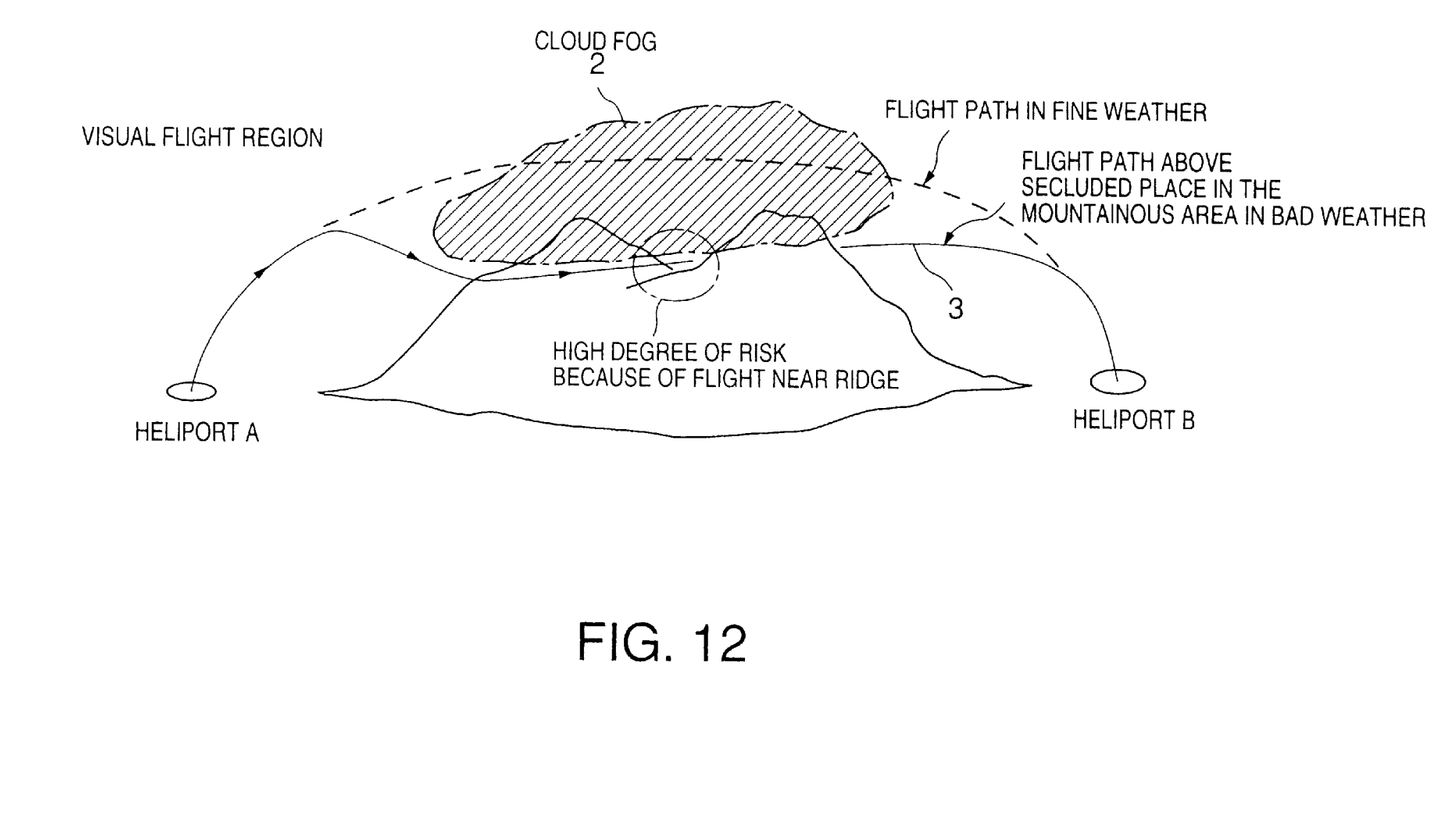
FIG. 12 is a schematic view for explaining conventional problems in the visual flight rules.

As shown in FIG. 12, even if the sky is covered by cloud 2 or fog, there are often some visibility near the ground. In addition, when it is bad weather, the rotor crafts often fly in a flight path 3 at a low altitude to intend to fly below the cloud 2. On the other hand, if the rotor crafts can raise its flight altitude to fly in the cloud 2, it is impossible to use the visual flight rules although safety is improved.

Such circumstances on operation conditions can not be applied to a large fixed wing aircraft, which flies at a high altitude wherein it is always clear up and which has no obstacles except for other aircraft.

(5) In recent years, IFR utilizing a global positioning system (GPS). This IFR provides air traffic control rules, which improves safety by exchanging the positional information obtained by the GPS between the respective fixed wing aircraft and which has a higher degree of freedom. However, there is a problem that such air traffic control rules are bound by a preset flight plan, so that it is not possible to completely solve the problems on the flight safety. Therefore, it is possible to obtain only limited advantages in order to improve the reliability of a rotor craft.

In order to solve these problems, it is considered utilizing a simulation technique. A simulation technique, which is currently used for the development of aircraft, the pilot training and so forth, is widely applied to the field of amusements as a so-called virtual reality technique. In this technique, a three-dimensional digitized map, i.e., a virtual space, is prepared to be provided to a pilot as an image projected on a display, which is mounted on a helmet, or on a domed screen.

As will be described later, in this prior art, there are the following problems a through d in that it is not possible to faithfully reflect the actual situation which changes every moment.

a. Although it is required to artificially input an image, it is impossible to input all the actual situation on the ground since it takes a great deal of time.

b. Although it is required to inspect the image in comparison with the actual topography in order to insure safety, it also takes a great deal of time.

c. There is a problem that it is impossible to obtain a depth perception and a sense of speed if the image is simplified, so that there is a serious disadvantage in that the pilot does not notice that the aircraft approaches the ground.

d. The digital map published by the Geographical Survey Institute is a three-dimensional map information and has a high utility value. However, this digital map as well as all the above artificial maps are short of reality.

It is also considered utilizing rules for providing the pilot with an image obtained by a millimeter wave radar. Such rules sufficiently narrow beams of a millimeter wave radar to irradiate the narrowed beams in vertical and horizontal directions to form an image in the same manner as a manner for forming a screen of a television, and displays the image for the pilot. Since millimeter waves travel relatively far even in bad weather, the millimeter waves are suitable for a display unit in bad weather.

Unlike the above described artificial display system, since the pilot flies while observing the actual topography by means of radio waves, there is an advantage in that the pilot can observe the actual topography in real time. However, there are the following problems e through g in that it is possible to prepare an image having reality, which satisfies the pilot, by only millimeter waves.

e. Since the antenna of a millimeter wave radar is relatively large and heavy, it is not possible to irradiate beams of the millimeter wave radar in vertical and horizontal directions with a high frequency. Since the frequency is about 10 Hz at the highest, it is impossible to obtain an image changing every moment, such as a television picture, in theory (15000 Hz in television). Even if the number of scanning lines on a screen is about 50, which is about a tenth of that of television, the update rate is a few seconds, and the image seems to be an image obtained by changing still images every a few seconds. Therefore, this image can not be suitably used as a visual field image for a helicopter pilot.

In addition, since the wavelength of a millimeter wave is far longer than that of a light wave, the image is considerably faded even if it takes a sufficient time to iradiate the beams, so that it is too insufficient to form the pseudo field of vision.

f. Since it takes a lot of time to prepare an image by means of a computer, the prepared image is always a delayed image.

g. If the scanning angle range of the radar is reduced, the image is relatively sharp. However, if the pilot's field of vision is narrow, it is impossible for the pilot to safely operate the rotor craft to make a flight.

SUMMARY OF THE INVENTION

It is therefore an object of the present invention to eliminate the aforementioned problems and to provide a virtual image forming system for providing a pilot or the like with the artificially generated virtual images, which can have reality close to the actual field of vision and which can be generated in real time by always inputting the current information, even if there is no visibility in bad weather.

It is another object of the present invention to provide a flight system and an aircraft virtual image forming system, which can provide an aircraft capable of being operated by the visual flight rules even in bad weather.

In order to accomplish the aforementioned and other objects, according to one aspect of the present invention, there is provided a flight system provided in an aircraft wherein a pilot sitting on a seat is capable of viewing the actual field of vision of the external world through a window, the flight system comprising: display means, provided in front of eyes of the pilot, for displaying virtual images of the external world while allowing the pilot to see the actual field of vision of the external world through the window; a first memory for storing wide-area information, which includes latitude, longitude and altitude of a wide area corresponding to respective positions on a map; a second memory for storing narrow-area information; which includes latitude, longitude and altitude of a narrow area narrower than the wide area corresponding respective positions on the map; a third memory for storing obstacle information, which includes latitude, longitude and altitude of an obstacle; first detecting means for detecting latitude, longitude and altitude of the aircraft; second detecting means for detecting the present position of the pilot and the posture of the front of a face of the pilot; and processing means, in response to the respective outputs of the first, second and third memories and the first and second detecting means, for reading the wide-area information, the narrow-area information and the obstacle information out of the first, second and third memories, and causing the latitude, longitude and altitude of the memories to coincide with each other to generate the virtual images to display the virtual images on the display means so that the area and obstacle in the virtual images are superimposed on the area and obstacle in the actual field of vision viewed by the pilot through the display means.

In this system, the wide-area information, the narrow-area information and the obstacle information are previously stored in the first, second and third memories, respectively, and the information on the aircraft and the information on the front of the face of the pilot are detected by the first and second detecting means, respectively, to generate the virtual images on the display means by means of the processing means. Thus, the area and obstacles in the virtual images of vision are superimposed on the area and obstacles in the actual field of vision by the display means. Therefore, even if an observer, such as a pilot, can not observe the actual field of vision of the external world, e.g., in bad weather, it is possible to fly as if the observer makes an ordinary visual flight.

The flight system may further comprise: a laser radar; narrow-area information arithmetic means for generating the narrow-area information on the basis of an output of the laser radar to store the generated narrow-area information in the second memory; and obstacle information arithmetic means for generating the obstacle information on the basis of the output of the laser radar to store the prepared obstacle information in the third memory. The laser radar may irradiate laser beams in a substantially downward direction to obtain the narrow-area information, and irradiate the laser beams in a substantially forward and horizontal direction to obtain the obstacle information. In these cases, the laser radar can scan at a high speed in a wide range by means of a small mirror, and the laser beams can travel about 10 km or more in fine weather, so that the narrow-area information can be surely obtained. Moreover, it is possible to detect, e.g., high-voltage power lines and lift cables, at a high resolution by means of the laser radar.

The flight system may further comprise a millimeter wave radar, and the obstacle information arithmetic means may generate the obstacle information on the basis of outputs of the laser radar and the millimeter wave radar to store the generate obstacle information in the third memory. The millimeter wave radar may irradiate electromagnetic wave beams in a substantially forward and horizontal direction to obtain the obstacle information.

In these cases, in order to obtain the narrow-area information, the laser beams of the laser radar are irradiated in a substantially downward direction by a rotor craft, such as a helicopter, or another type of aircraft. In addition, in order to obtain the obstacle information, the laser beams and the electromagnetic wave beams of the millimeter wave radar, which is used if necessary, are irradiated a substantially forward and horizontal direction of the aircraft's axis. Thus, when the aircraft is making in a visual flight in bad weather, it is possible to recognize obstacles by recognizing the virtual images. Since the laser radar uses ultraviolet, it is possible to increase the scanning frequency thereof, and it is possible to obtain a sharp and clear image. However, in bad weather, the traveling range is short. On the other hand, since the millimeter wave radar has a long wavelength, the size of the scanning antenna or the like is large, and it is not possible to increase the scanning frequency, so that it is not possible to obtain a sharp image. However, even in bad weather, the traveling range is hundreds meters, so that it is possible to detect distant obstacles in comparison with the laser radar. Since there are such characteristic differences between the laser radar and the millimeter radar, it is possible to detect obstacles on the best conditions if both of the laser radar and the millimeter radar are provided for detecting obstacles in front. Therefore, it is possible to obtain a clear image by means of the laser radar, and it is also possible to detect distant obstacles by means of the millimeter wave radar. Even if only the laser radar is provided, when the flight conditions are selected in accordance with the characteristics thereof, it is possible to give full play to the obstacle detecting function. That is, basically, if the laser radar is provided, there is no problem on the obstacle detecting function. If the millimeter wave radar is additionally provided, it is possible to more improve the function.

The flight system may further comprise: means for discriminating whether the narrow-area information generated by the narrow-area information arithmetic means is different from the narrow-area information, which is stored in the second memory, with respect to the same position, and the narrow-area information arithmetic means may update the generated narrow-area information to store the updated narrow-area information in the second memory. In this case, only when it is determined by the discriminating means that the narrow-area information obtained by the operation is different from the narrow-area information stored in the second memory, the narrow-area information obtained by the narrow-area information arithmetic means is updated to be stored in the second memory. If both are the same, the narrow-area information from the narrow-area information arithmetic means is not stored in the second memory, i.e., not updated. Thus, the narrow-area information stored in the second memory is always displayed on the display means, so that it is possible to prevent the situation where no narrow-area information is displayed while the narrow-area information is stored.

The flight system may further comprise stored input directing means for directing the narrow-area information of the narrow-area information arithmetic means to be stored in the second memory by a manual operation. In this case, the pilot can manually operate the stored input directing means to input the narrow-area information. Thus, it is possible to more surely insure safety during a flight.

The stored input directing means may direct the obstacle information of the obstacle information arithmetic means to be stored in the third memory by a manual operation. In this case, the obstacle information is stored in the third memory by a manual operation, so that it is possible to more surely insure safety during a flight.

The display means may be capable of changing a density of the virtual images. In this case, the virtual images can be formed by, e.g., a liquid crystal display device, and the density or gradation of the display can be changed, so that the virtual images superimposed on the actual field of vision can be easily discriminated in accordance with the local topography and obstacles in the pilot's field of vision.

The flight system may further comprise receiving means for receiving a radio signal representative of latitude, longitude and altitude of a flying object, and the processing means may calculate an output of the receiving means to causes the display means to display thereon a character representative of an image of the flying object in the virtual images on the basis of the output of the receiving means so that the character is superimposed on the flying object in the actual field of vision. In this case, since the flying object serving as another aircraft is displayed in the pseudo field of vision by means of the display means, it is possible to surely allow the pilot to safely operate the aircraft. This flying object may be displayed by a character, e.g., a later, a graphic symbol or a sign.

The aircraft may be a rotor craft. In this case, the aircraft may be a rotor craft, e.g., a helicopter. Alternatively, the aircraft may be a gyroplane, a gyrodyne or a convertible aircraft comprising an airplane combined with a helicopter.

According to another aspect of the present invention, there is provided a system for generating the virtual images for an aircraft, the system comprising: a first memory for storing wide-area information, which includes latitude, longitude and altitude of a wide area corresponding to respective positions on a map; a second memory for storing narrow-area information, which includes latitude, longitude and altitude of a narrow area narrower than the wide area, corresponding respective positions on the map; a third memory for storing obstacle information, which includes latitude, longitude and altitude of an obstacle; display means for displaying the virtual images of the external world while allowing an observer to see the actual field of vision through the display means; detecting means for detecting the present position of the observer and the posture of the front of a face of the observer; and processing means, in response to the respective outputs of the first, second and third memories and the first and second detecting means, for reading the wide-area information, the narrow-area information and the obstacle information out of the first, second and third memories, and causing the standards of latitude, longitude and altitude of the memories to coincide with each other to generate the virtual images to display the virtual images on the display means so that the area and obstacle in the virtual images are superimposed on the area and obstacle in the actual field of vision viewed by the observer through the display means. In this system, virtual images is superimposed on the actual field of vision to be displayed on the display means, so that a pilot or another observer can recognize the field of vision. In particular, even if visibility is poor in bad weather, it is possible to safely make a flight.

Of course, the present invention is also applied to a small fixed wing aircraft which has an opportunity to fly at a low altitude. In particular, the present invention is intended to greatly improve safety in operation of a rotor craft, which must always make a visual flight, and to considerably improve the reliability, economical efficiency and usability thereof.

According to a further aspect of the present invention, there is provided a flight system provided in an aircraft wherein a pilot sitting on a seat is capable of viewing the actual field of vision of the external world through a window, the flight system comprising: display means, provided in front of eyes of a pilot, for displaying the virtual images while allowing the pilot to see the actual field of vision through a window; a memory for storing area information, which includes latitude, longitude and altitude of an area corresponding to respective positions on a map; first detecting means for detecting latitude, longitude and altitude of an aircraft; second detecting means for detecting the present position of the pilot and the posture of the front of a face of the pilot; and processing means, in response to the respective outputs of the memory and the first and second detecting means, for reading the area information out of the memory, generating the virtual images and displaying the virtual images on the display means so that the area in the virtual images is superimposed on the area in the actual field of vision viewed by the pilot through the display means.

According to a still further aspect of the present invention, there is provided a system for forming the virtual images for an aircraft, the system comprising: a memory for storing area information, which includes latitude, longitude and altitude of an area corresponding to respective positions on a map; display means for displaying the virtual images while allowing an observer to see the actual world in the actual field of vision through the display means; detecting means for detecting the present position of the observer and the posture of the front of a face of the observer; and processing means, in response to the respective outputs of the memory and the detecting means, for reading the area information out of the memory generating the virtual images and displaying the virtual images on the display means so that the area in the virtual images is superimposed on the area in the actual field of vision viewed by the observer through the display means.

In these systems, e.g., in a rotor craft, the virtual images including area, obstacles and characters, such as letters, are superimposed on the actual field of view to be displayed.

The display means may be mounted on a head or face of a pilot by means of a helmet as described in the undermentioned preferred embodiments. Alternatively, the display means may be mounted on a face of a pilot by means of a temple of a spectacles or the like. With this construction, it is possible to decrease the size of the display means. In another preferred embodiment of the present invention, the display means, such as a liquid crystal display panel, may be adhered to the inner surface of a translucent, such as a window glass, to be fixed to the airframe of the aircraft. The pseudo field of vision may be superimposed on the actual field of vision using such a relatively large display means.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Figure 1:
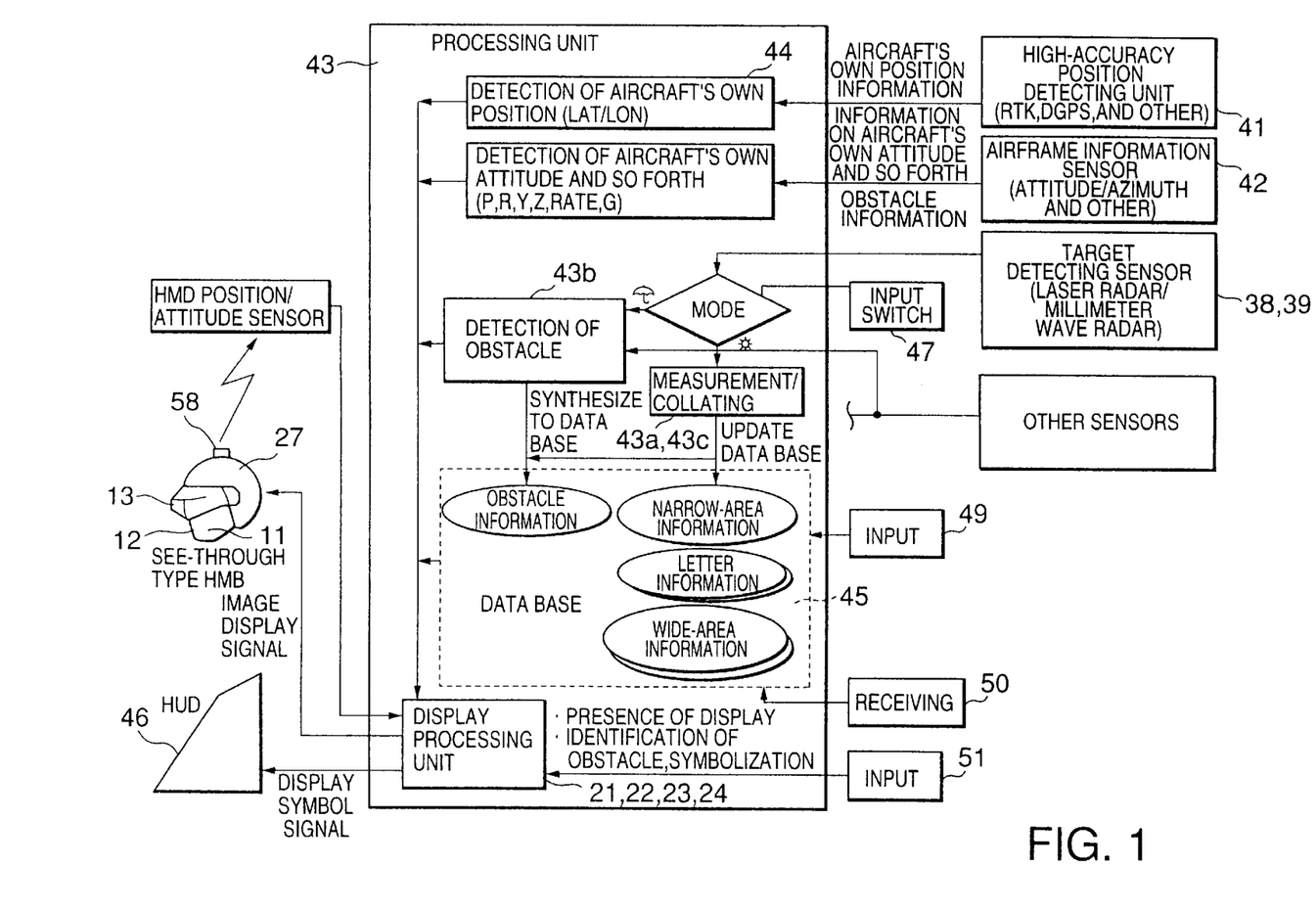
FIG. 1 is a schematic block diagram of a hardware of a flight system according to the present invention.

FIG. 1 is a schematic block diagram of the whole construction of the first preferred embodiment of a flight system according to the present invention. A pilot 11 operating an aircraft, particularly a rotor craft such as a helicopter, puts on a helmet 27, on which a display means 13 is mounted to display virtual images (pseudo field of vision) of the external world in front of the face 12 of the pilot 11. The pilot 11 can also see the actual field of vision of the external world through the display means 13. The display means 13 comprises, e.g., a see-through type liquid crystal display panel.

The system shown in the hardware block diagram of FIG. 1 is provided with sensors, which include: a high-accuracy position detecting unit 41 using the differential global positioning system (DGPS), the real time kinematics (RTK) or the like, which can derive the aircraft's own position at a high accuracy of centimeters; an airframe attitude/azimuth sensor 42 based on a gyroscope or the like; and a laser radar 38 and a millimeter wave radar 39, which acquire a topography information.

A processing unit 43 comprises an aircraft's own position/attitude detecting unit 44, a data base memory 45, and the display means 13. The area and obstacle information, which is obtained by cameras 30 and 31 of FIG. 4 (which will be described later) and target information sensors, such as the laser radar 38 and the millimeter wave radar 39, are stored in the data base memory 45 containing memories M1 through M3 of FIG. 3, which will be described later. At this time, methods for storing and processing data are changed by an operation mode.

Data are taken out of the aircraft's own position and attitude to generate the virtual images (pseudo field of vision) on a helmet mounted display (HMD) by means of the display means 13 to provide the pilot with them. The helmet 27 is also provided with a sensor 58 for detecting the direction and position of the helmet 27. A par of data may be projected on a head-up display (HUD) means 46.

Figure 2:
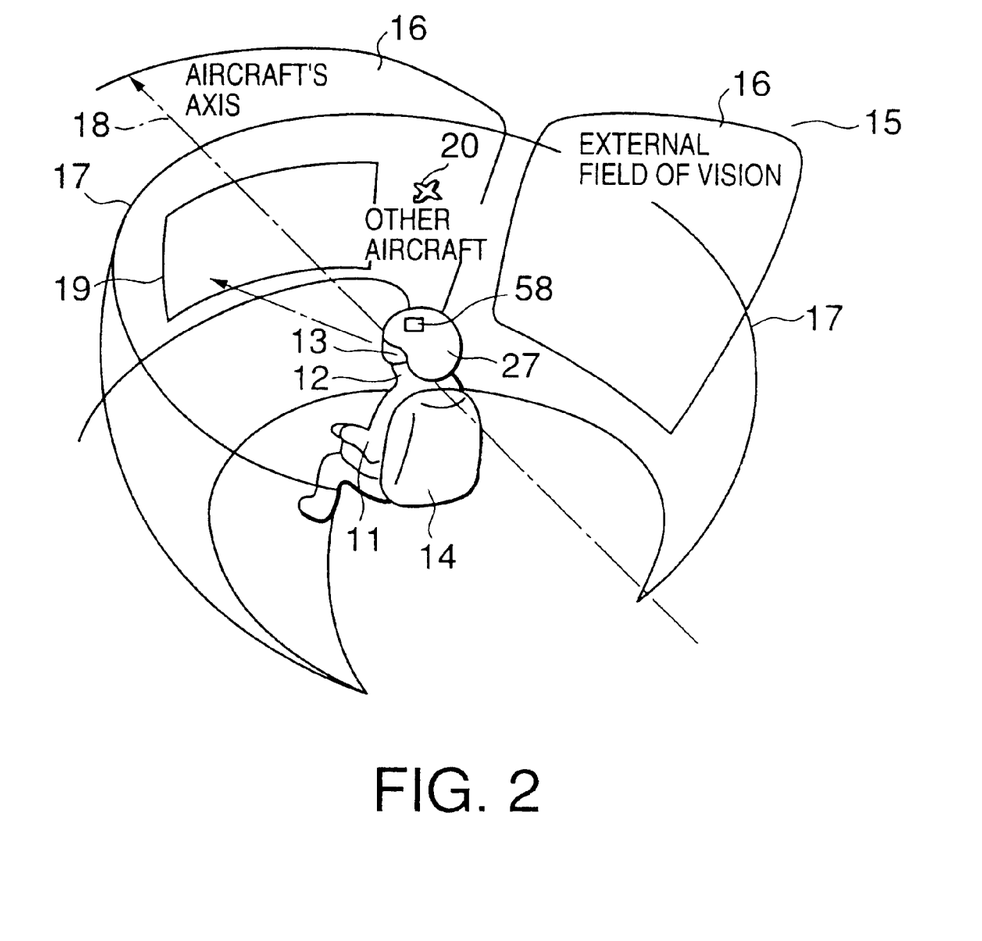
FIG. 2 is a schematic view showing the display state of virtual images (pseudo field of vision)

FIG. 2 is a schematic view for explaining a method for displaying the pseudo field of vision. This figure shows the use of the HMD serving as the display means 13. In the aircraft, the pilot 11 sitting on a seat 14 can view the actual field of vision of the external actual world, and also in the pseudo field of vision 17 superimposed on the actual field of vision by means of the display means 13. A window 16 is formed in front of the pilot 11 so as to extend from the right side to the left side with respect to the aircraft's axis 18. Obstacles are displayed on a front display region 19 in the pseudo field of vision 17.

A flying object 20, such as other aircrafts, is displayed by a character, such as X, in the pseudo field of vision 17, so that the pilot 11 can easily recognize the position and form of anther aircraft. In this case, similar to the flying object 20 of FIG. 2, another aircraft can be symbolized by a character so as to be clearly visually recognized. The position of another aircraft obtained by the global positioning system (GPS) is inputted, and the symbolized image is superimposed on the pseudo field of vision 17 to be displayed. That is, the pilots of the respective aircraft can mutually communicate the aircraft's own position to each other by means of the GPS, and the position of another aircraft can be symbolized and displayed in the pseudo field of vision, so that it is possible to insure safety.

The aircraft's own position is detected by the GPS, and the position information is transmitted to another aircraft by a transmitting means. The another aircraft's position information transmitted as a radio signal is received by receiving means 50 of FIG. 1 in the aircraft flight system according to the present invention. The radio signal received by the receiving means 50 indicates the longitude, latitude and altitude of another aircraft. This information on another aircraft is stored in the memories M1, M2 and M3 of the data base memory 45 in order to display the flying object 20 as described above. Therefore, the flying object 20 in the pseudo field of vision is superimposed on another aircraft in the actual field of vision to be displayed on the display means 13.

Wide-area information is displayed so as to extend in a range of 180 degrees on the right and left sides of the pilot 11 to be easily balanced. Although it is not required to display both end portions in the field of vision in detail, the information on balance, such as the horizon, is very important to be displayed. Since the wide-area information is displayed in the pseudo field of vision having a great angle of visibility, which is about 180 degrees on the right and left sides of the pilot, the angle of visibility is increased. Although man obtains the sense of balance by viewing the right and left ends in the field of vision, the balance is particularly important to operate the airframe 15, so that the wide field of vision is effective.

The portions near the front are displayed on the display region 19 in detail. The displayed narrow-area information and obstacle information, particularly the obstacle information, may be displayed only on the front.

Even in bad weather, there are scarcely cases where the visibility is completely interrupted, so that it is possible to get an unobstructed view within about 100 m or an unobstructed view of a part far. Therefore, when the superimposed view is formed, it is not required to provide extremely detailed virtual images in the system of the present invention. This is very important in order to decrease the costs and improve the follow-up speed of the image to provide the system of the present invention.

Figure 3:
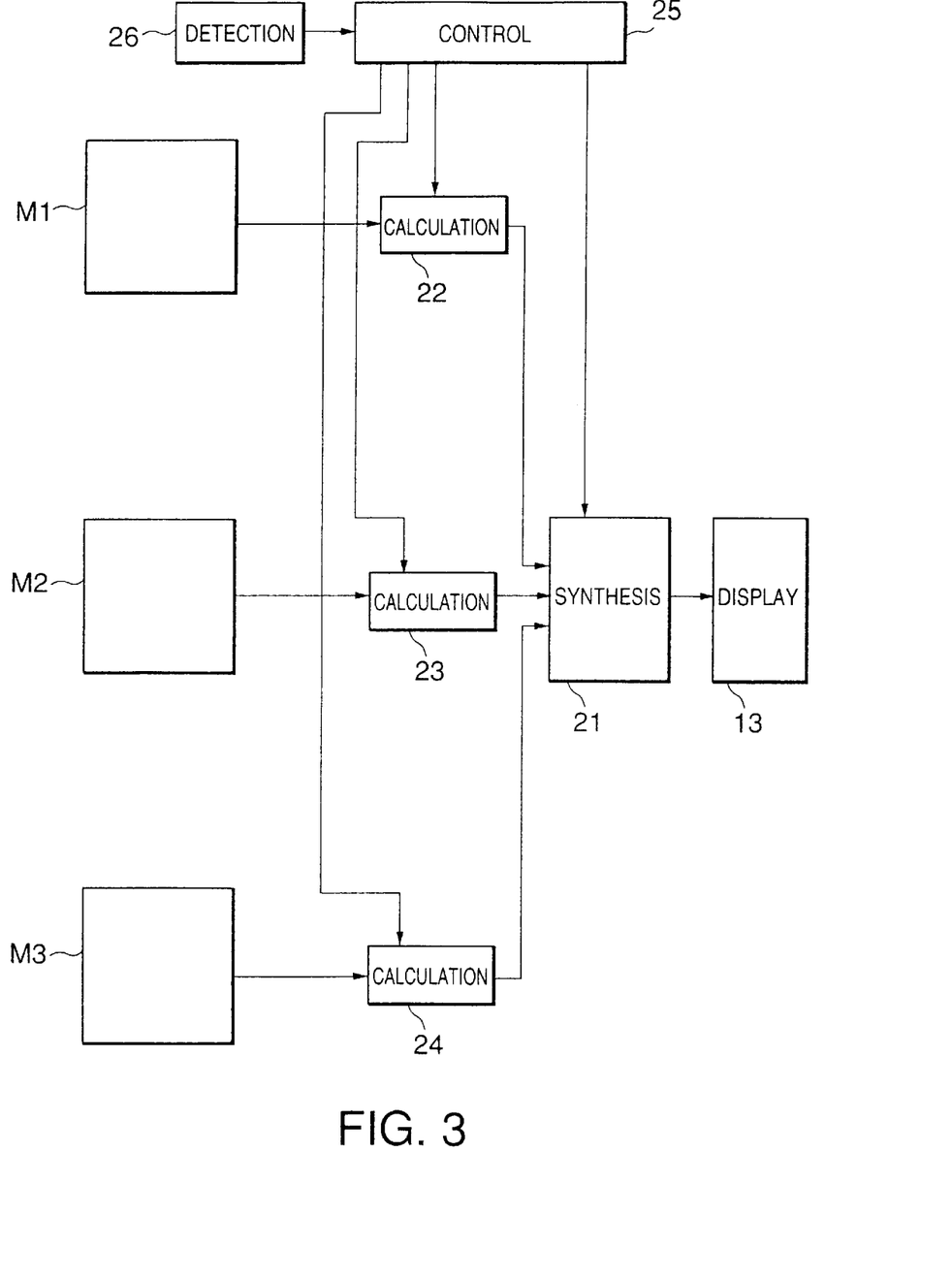
FIG. 3 is a schematic block diagram of a system for displaying the pseudo field of vision on a display means.

FIG. 3 is a schematic block diagram of a system for displaying the pseudo field of vision on the display means 13. The first memory M1 stores therein a three-dimensional digital map serving as the wide-area information, the second memory M2 stores therein the narrow-area information, and the third memory M3 stores therein the obstacle information. The first memory M1 stores therein the coordinates (x, y, z) of a three-dimensional space in a rectangular coordinate system xyz in a three-dimensional space of area as a digital map of wide area. The latitude, longitude and altitude correspond to x-axis, y-axis and z-axis, respectively. Therefore, the content stored in the memory M1 is a single data space. Similarly, the memory M2 stores therein the latitude, longitude and altitude of narrow area as a digital map. Moreover, the memory M3 stores therein the latitude, longitude and altitude of an obstacle as a digital map.

The synthesized three-dimensional map displayed on the display means 13 basically has the three-axes information on the latitude, longitude and altitude every point, and these three types of wide-area information, narrow-area information and obstacle information have data necessary for a three-dimensional map. Therefore, the respective informations outputted from the memories M1, M2 and M3 are processed by arithmetic circuits 22, 23 and 24, enlarged or reduced and transformed so as to be able to display a distant place small. Thereafter, the transformed informations are synthesized by a synthesizer circuit 21 to form an image data for a single screen. In the process for superimposing the respective informations from the memories M1, M2 and M3, the arithmetic circuits 22, 23 and 24 can cause the standards of the three axes of the latitude, longitude and altitude to be coincident with each other, so that the superimposition and display can be easily carried out to form a single screen, and the displayed topography and buildings can be displayed on the same scale. The processing of the arithmetic circuits 22, 23 and 24 are controlled by a control circuit 25. To the control circuit 25, the output of a detecting means 26 is supplied.

In this case, the synthesizer circuit 21 and the arithmetic circuits 22, 23 and 24 are associated with each other to form a display processing unit. The control circuit 25 and the detecting means 26, which are not shown in FIG. 1, are provided in the processing unit 43.

In order to superimpose the pseudo field of vision on the actual field of vision, (1) data on the latitude and longitude of the aircraft's own position derived by data obtained by the DGPS or the RTK, (b) data including pitch, roll, yaw and altitude of the airframe 15 of aircraft, the time varied rates of these values, and the accelerations of these values, which are obtained by operating the output signals of the gyroscope and various sensors provided in the airframe 15, and (c) data on the current position of the head or face 12 of the pilot 11 and the front attitude of the face 12, i.e., the direction of the face 12 facing ahead, which are detected by the sensor 58 mounted on the helmet 27, on which the display means 13 is mounted, are inputted to the control circuit 25 from the detecting means 26, so that the control circuit 25 can control and derive the viewing position and direction of the pilot 11. Thus, the three types of three-dimensional maps are displayed on the display means 13 in the pseudo field of vision as topography viewed from the position of the face 12 of the pilot 11 in the direction thereof. Thus, the pseudo field of vision can be accurately superimposed on the actual field of vision.

Figure 4:
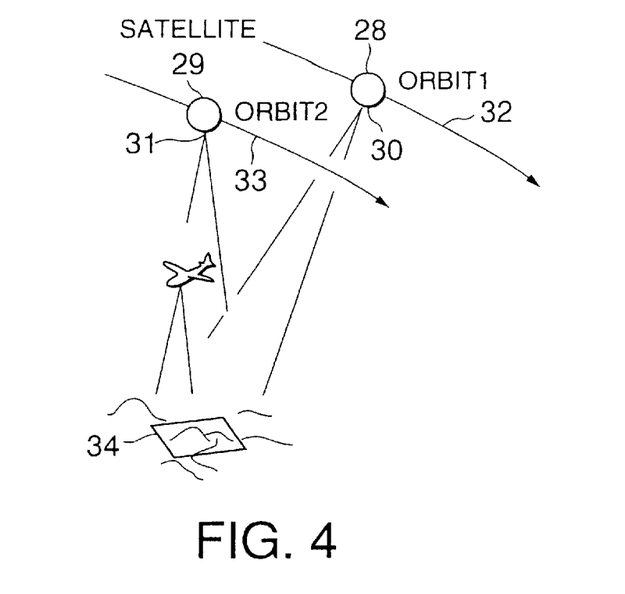
FIG. 4 is a schematic view for explaining a method for generating wide-area information.

Referring to FIG. 4, a method for preparing the wide-area information will be described. First, a photographs of a region 34 having an area, the side of which has a length of tens km (e.g., 20 through 30 km, or 40 through 50 km), is taken by a high resolution camera 30 mounted on a satellite 28 in orbit 31. Then, a photograph of the region 34 is taken by a high resolution camera 31 mounted on a satellite 29 in orbit 33. The altitude difference can be determined by synthesizing these two photographs. On a virtual plane containing the cameras 30 and 31 and one point in the region 34, a virtual triangle is obtained by drawing lines between the cameras 30 and 31 and the point. Then, the three-dimensional position of the one point can be detected by the distance of the base between the cameras 30 and 31 and the base angles in the virtual triangle. This is digitized to generate a three-dimensional map shown in FIG. 5(a).

Figures 5A, 5B, 5C:
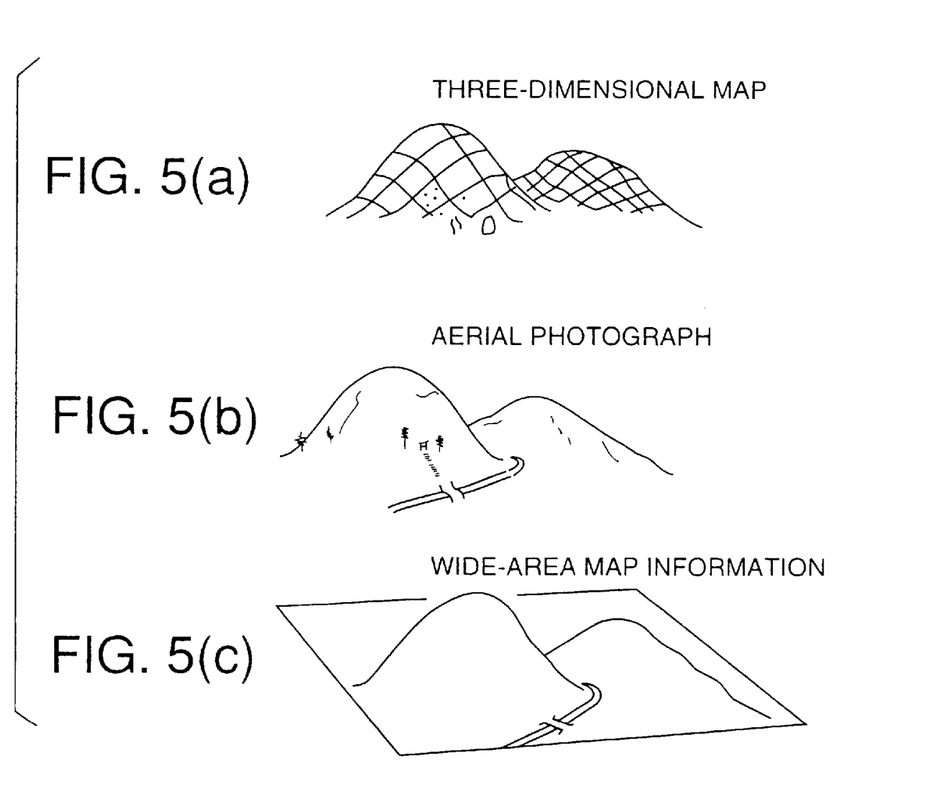
FIGS. 5(a) through 5(c) are schematic views for explaining a process for obtaining wide-area map information by superimposing an aerial photograph on wide-area information.

Then, an aerial photograph of FIG. 5(b) is superimposed on the prepared three-dimensional map and colored to prepare a real wide-area information of FIG. 5(c). Since this method is based on photographs unlike the above described digital map of the Geographical Survey Institute, there is an advantage in that it is possible to faithfully describe the actual topography. This wide-area information can be suitably used to display a distant place scene near the horizon, mountain regions, lakes, roads, rivers and so forth.

Figure 6:
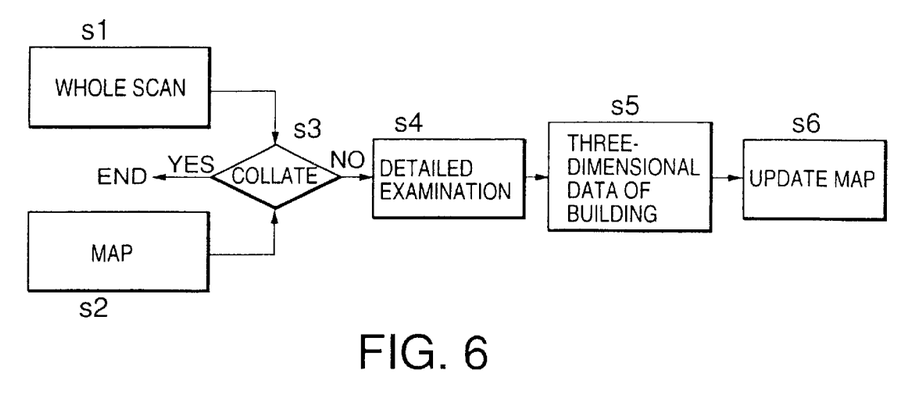
FIG. 6 is a flowchart for explaining a method for obtaining narrow-area information.

FIG. 6 is a flowchart for explaining the operations of a narrow-area information arithmetic unit 43a, which is provided in the processing unit 43, and the control circuit 25

Figure 7:
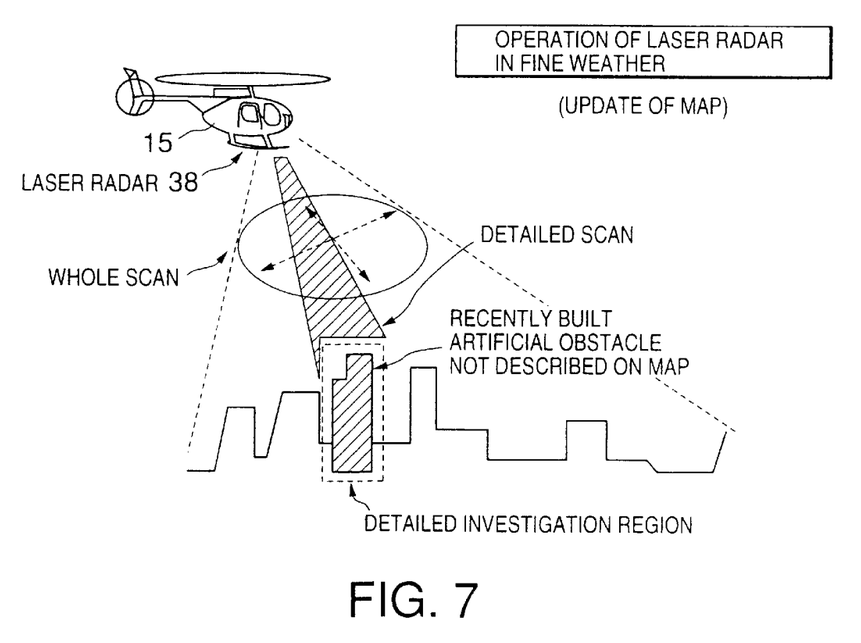
FIG. 7 is a schematic view for explaining a method for generating narrow-area information.

(FIG. 3) for preparing the narrow-area information. FIG. 7 is a schematic view for explaining a method for preparing the narrow-area information. A method for obtaining informations on a detailed topography, which is not described on the wide-area information, and on newly built high buildings will be described below. At step s1 of FIG. 6, the narrow laser beams of a laser radar 38 mounted on a helicopter airframe 15 are irradiated in longitudinal and lateral directions, and the reflected waves are processed to obtain a detailed area information. In this preferred embodiment, since it is required to acquire a great deal of data in order to describe a real image, it is difficult to display topography on the display in real time.

Therefore, in this preferred embodiment, at step s1 of FIG. 6, when the helicopter flies in fine weather, the beams of the laser radar 38 are irradiated downwards as shown in FIG. 7 to repeatedly acquire and store a lot of data in the memory M2 to previously prepare a digital map. During a flight, an image is read out of this digital map using the virtual reality technique, to prepare the pseudo field of vision. Thus, two stages of procedures are carried out. The accuracy of the above narrow-area information is enhanced by superimposing the area information previously collected by the previous flights in the same region many times. That is, the above narrow-area information is the current three-dimensional map.

In order to acquire data, data obtained by a plurality of helicopters, not only one helicopter, are downloaded in a computer on the ground to be stored therein to be synthesized, so that it is possible to obtain detailed data to enhance the accuracy thereof. It is also possible to store the area information of a region where the helicopter has not flied.

Moreover, the data are always updated to the current data at step s6. That is, the information obtained by the laser radar 38 at step s1 is compared with the information, which has been obtained at step s2, by means of a discriminating means 43c at step s3. If both informations are not the same, the routine goes to step s4. At step s4, with respect to only the ground information which has not been prepared as data, i.e., with respect to only the information on artificial obstacles, such as quite recently built high buildings and bridges, the detailed scanning is carried out, so that the data at step s5 can be effectively updated. Thus, the image always updated to the current data can be obtained at step s6. Since it is not easy to prepare the above detailed map, it is considered that the detailed map is not updated for at least two or three years once it is prepared. Therefore, it is required to always add newly build middle and high buildings and bridges to the prepared map to update the map to obtain the current map.

Such superimposition of the area information can not be carried out unless a detailed position measuring system is used. Such superimposition can not be carried out by a household GPS since it has a position error of about 100 m. However, the above superimposition can be carried out by the differential GPS (DGPS) or the real time kinematics (RTK), which have only a position error of about a few cm.

Although this operation can be carried out by the millimeter wave radar 39, it is difficult to irradiate beams at a high speed since it has a large antenna.

Since the laser radar 38 can irradiate laser beams at a very high speed by vibrating a small mirror, it is possible to easily scan beams in a wide range. Moreover, although laser beams can travel only about 100 m in the rain or fog, the laser beams can travel 10 km or more in fine weather, so that the above data acquisition can be achieved. Therefore, it is possible to obtain an image having no time lag. Near the ground, the landscape rapidly changes. In addition, if the rapid operation of the helicopter is carried out, the pilot's field of vision varies greatly and rapidly. If the pilot can not follow this motion, safety deteriorates, and seasickness is caused. These problems can be solved by using the laser radar 38.

On the wide-area information obtained from the photographs taken by the satellites, individual houses and buildings can be written. Since the detailed topography of a required region can be obtained by the above described narrow-area information, the pilot can obtain a depth perception, a sense of altitude and a sensor of speed so as to obtain a very real sense. This is very important in a rotor craft, which often flies at a low altitude. When the above described narrow-area information is prepared, the laser beams of the laser radar 38 are turned substantially downwards to investigate topography as shown in FIG. 7.

Thus, it is possible to obtain a good quality image, which has reality very close to the actual landscape and which does not cause the pilot to be tired even if the pilot continues to view the image, the image having a depth perception and a sense of speed, and the image allowing to discriminate individual houses and large trees.

Figure 8:
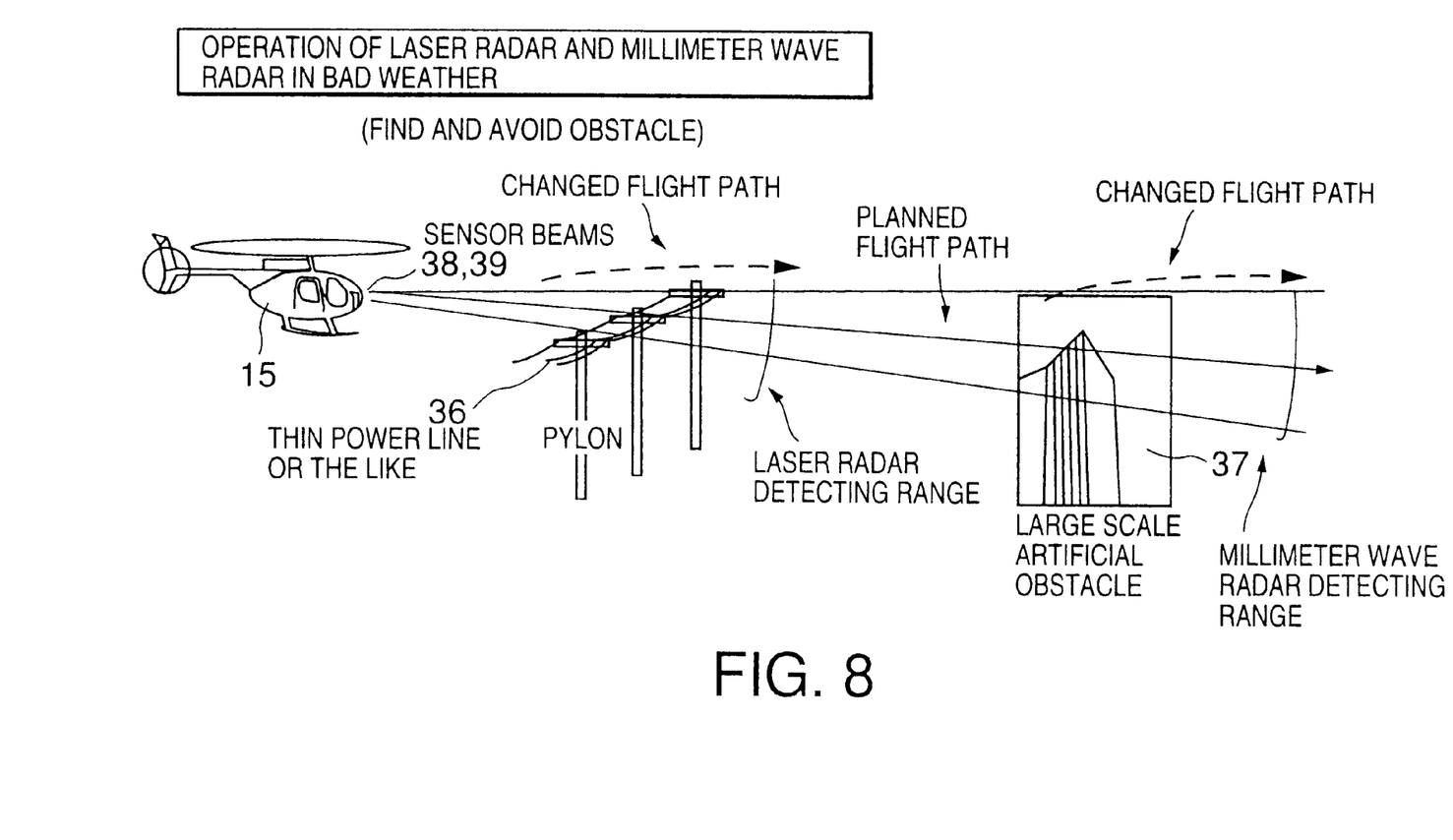
FIG. 8 is a schematic view for explaining a method for generating obstacle information.

FIG. 8 is a schematic view showing a method for preparing the obstacle information by means of the obstacle information arithmetic unit 43b. In bad weather, the pilot intends to fly while recognizing the ground, so that the pilot often flies at a low altitude near the ground. At this time, there are many obstacles, such as high-voltage power lines 36, high buildings 37 and cranes.

Also in a mountainous area, a lift is used to transport wood, orange and so forth. This lift cable is a very dangerous obstacle to helicopters. Since these obstacles are installed in a short time, there is a strong possibility that the obstacles are not written on the narrow-area information.

Therefore, according to the present invention, the respective beams of the laser radar 38 and the millimeter wave radar 39 are tuned in a forward and horizontal direction, and the helicopter flies while investigating obstacles. In order to collect the obstacle information, the laser beams of the laser radar 38 are turned in a substantially forward and horizontal direction to investigate ahead in the expected flying direction of the airframe 15 and the vicinity thereof.

Since the laser radar 38 uses ultraviolet, the laser radar 38 can obtain a clear image, but the traveling range thereof is short in bad weather. On the other hand, since the millimeter wave radar 39 uses a millimeter wave having a long wavelength, the millimeter wave radar 39 can detect distant obstacles even in bad weather, although the image obtained by the millimeter wave radar 39 are not clear in comparison with the image obtained by the laser radar 38. Therefore, if both of the laser radar 38 and the millimeter wave radar 39 are used, it is possible to obtain a clear image as well as to detect distant obstacles. Furthermore, even if only the laser radar 38 is used without using the millimeter wave radar 39, it is possible to sufficiently achieve the obstacle detecting function.

Even if the laser radar 38 is used to investigate ahead in the expected flying direction of the airframe 15 and the vicinity thereof as described above, it is impossible to acquire sufficient data to form an image. Therefore, it is determined only whether there are at least obstacles ahead, so that the airframe 15 of the aircraft is allowed to ensure safety for the present while the kinds of the obstacles are not recognized. It is possible to find temporary large obstacles, such as large cranes and cableways, which are not written on the information stored in the memories M2 and M3, and are installed immediately before a new flight, to avoid them. However, in this case, even if it is not possible to accurately recognize the form of the obstacles, it is possible to obtain a suitable display so as to avoid these obstacles for the present.

The millimeter wave radar. 39 has a traveling range of about hundreds meter in bad weather. However, since the resolution of the millimeter wave radar 39 is bad, the millimeter wave radar 39 is used to find high buildings 37 and cranes. Although the laser radar 38 has only a traveling range of about 100 m in bad weather, the laser radar 38 can discriminate thin wires 36 and so forth.

If the pilot finds such an obstacle to carry out emergency procedure, it is possible to avoid the obstacle at the last moment. However, since the scanning ranges of the laser radar 38 and the millimeter wave radar 39 are very narrow, the obstacle is positioned beyond the scanning ranges when the helicopter approaches the obstacle. Therefore, when only the outputs of the laser radar 38 and the millimeter wave radar 39 are used, the pilot must fly over the obstacle while feeling helpless.

In order to avoid such a situation, according to the present invention, the obstacle information is temporarily stored on the digital map in the memories M1, M2 and M3. Thus, the pilot can always recognize obstacles in the pseudo field of vision before flying over the obstacles. That is, if the obstacle information is temporarily stored in the computer on the aircraft, it is possible to continue to display the obstacle information as visual information in the maximum angle of visibility, even if the obstacle is positioned beyond the detecting ranges of the laser radar 38 and the millimeter wave radar 39.

It is possible to see an image in the actual field of vision, which are superimposed on the pseudo image generated as described above. First, this is carried out in order to recognize whether the system for forming the pseudo field of vision correctly functions. Like a dactyloscopy in a criminal investigation, only a part of the image can be sufficiently discriminated. Secondly, if it is possible to view the actual object, the extremely detailed topography information, which can not displayed by the narrow-area information, can compensate its lacks by forming the topography information so that it is possible to see the actual object.

Therefore, although it is not required to provide this system in fine weather, it is required that the adjustment can be carried out so that it is possible to see the actual field of vision of the external world superimposed on the pseudo field of vision at least when it is possible to see the actual field of vision of the external world even in bad weather. It is often possible to obtain a visibility of about 100 m, unless the sky is shrouded in so dense fog, so that it is required to superimpose the pseudo field of vision on the actual field.

Figure 9:
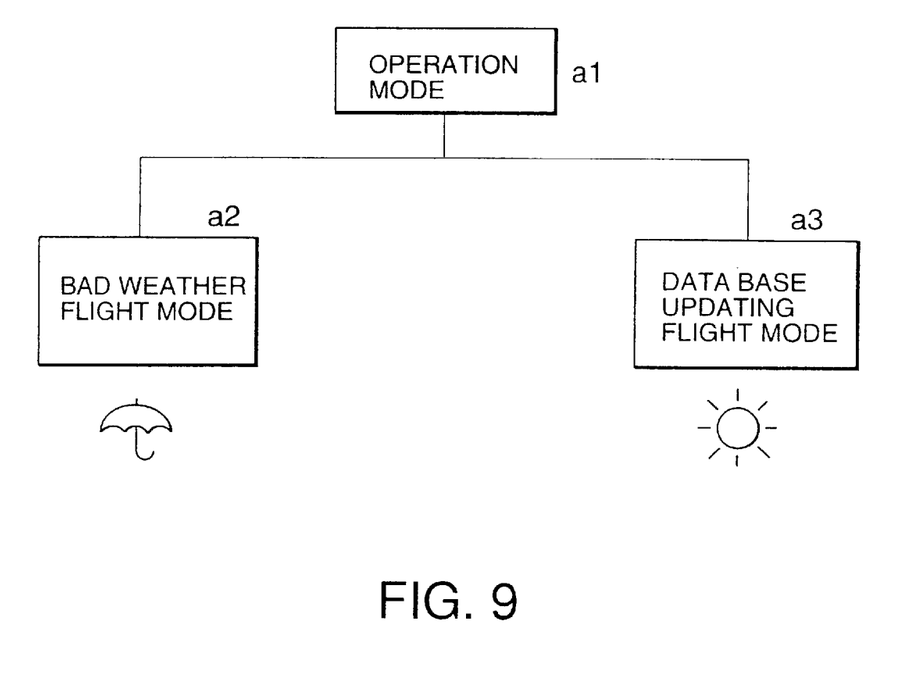
FIG. 9 is a schematic view for explaining an operation mode.

FIG. 9 is a schematic view for explaining an operation mode. An operation mode a1 comprises a bad weather flight mode a2 and a data base updating flight mode a3. Basically, in fine weather, the system for generating the pseudo field of vision is not required unless the helicopter flies at a very low altitude at which there is some possibility that the helicopter collides with an obstacle. Therefore, in fine weather, the topography information is collected to be stored in the data base memory 45. In bad weather, the pseudo field of vision is created using the topography information so that the pilot can safely fly.

In order to operate the laser radar 38, two kinds of modes including the data base updating flight mode a3 and the bad weather flight mode a2 are prepared. In the former mode a3, the narrow-area information is prepared, and in the latter mode a2, the obstacle information is prepared. The narrow-area information and the obstacle information are stored in the memories M2 and M3, respectively.

Figure 10:
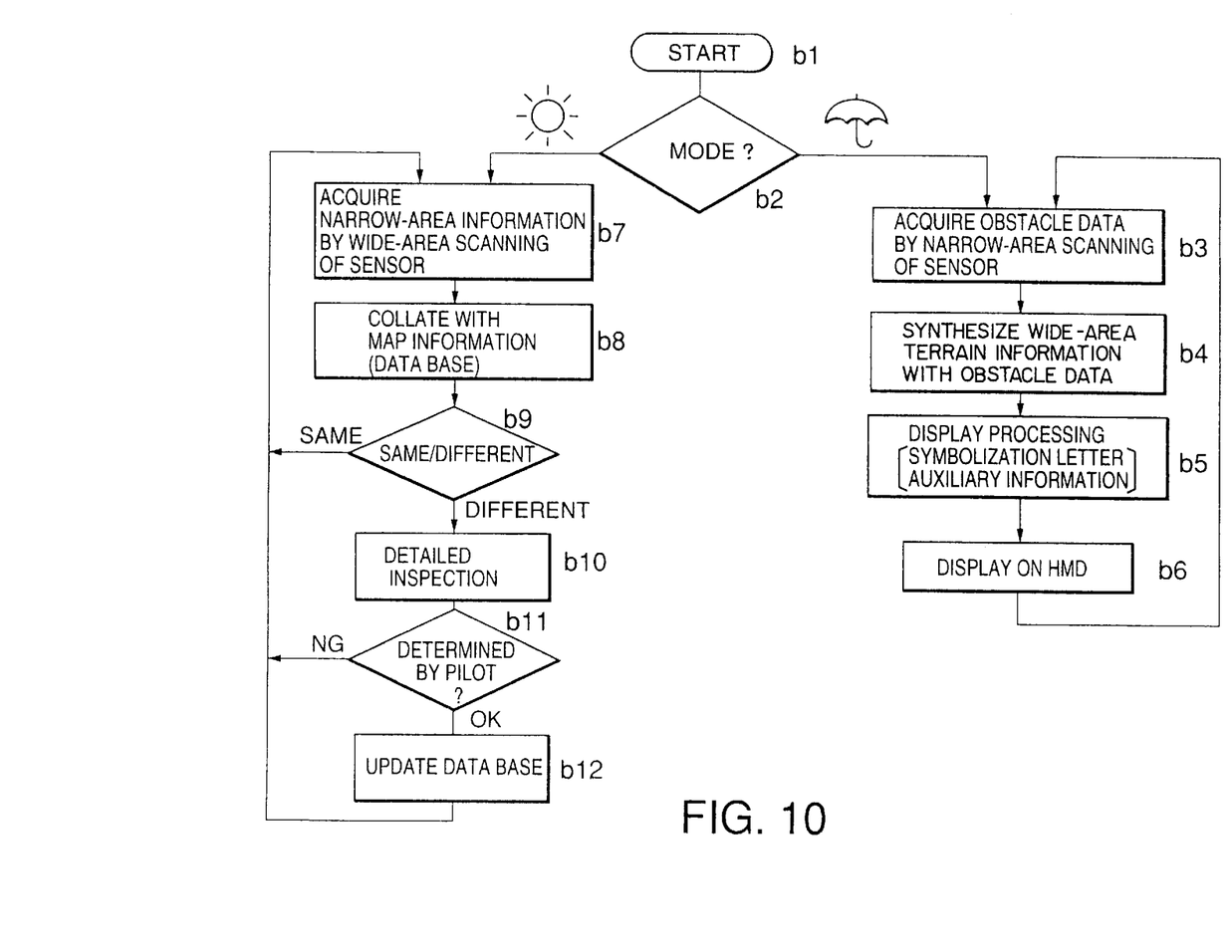
FIG. 10 is a flowchart for explaining a software.

FIG. 10 is a flowchart for explaining a software for the operation mode. In bad weather, in accordance with steps b3 through b6 in the flow shown by an umbrella mark, the beams of the laser radar 38 and the millimeter wave radar 39, which serve as sensors, are turned ahead in the flying direction to acquire an obstacle information, which is synthesized with the topography information of the memory M2 to be displayed on the HMD serving as the display means 13.

First, at step b3, the beams of the laser radar 38 and the millimeter wave radar 39 are irradiated in the flying direction, i.e., in a substantially forward and horizontal direction, to acquire the obstacle information from the obstacle information arithmetic means 43b. At step b4, the wide-area information is synthesized with the obstacle information obtained at step b3. At step b5, the obstacle is symbolized by a character to be displayed on the display means 13, and a signal indicative of auxiliary information using a letter is prepared. Thus, this is displayed on the display means 13 at step b6.

In the data base updating flight mode, in accordance with steps b7 through b12 in the flow shown by a fine weather mark, the sensors are turned substantially downwards as shown in FIG. 7 to acquire a narrow-area information by the narrow-area information arithmetic means 43a to compare the acquired narrow-area information with the narrow-area information stored in the memory M2. When these informations are not the same., the more detailed investigation of topography is carried out to update the topography information (i.e., the data base memory 45) after the pilot recognizes it.

First, at step b7, the wide scanning of the laser radar 38 and the millimeter wave radar 39 is carried out to acquire a narrow-area information by the narrow-area information arithmetic means 43a. At step b8, the narrow-area information is collated with the map information in the memories M1 through M3 of the data base memory 45. When it is determined at step b9 that both the data are not the same, the local topography in the different part is inspected at step b10. Then, at step b11, when the pilot 11 directs the memory M2 to store therein the different narrow-area information by means of a stored input directing means 49, the narrow-area information is stored in the memory M2 of the data base memory 45 to be updated at step b12.

In order to prepare the narrow-area information by means of the laser radar 38, the difference between the narrow-area information and the wide-area information is examined. If there is a difference, the different portion is locally inspected to be stored in the memory M2. If there is no difference, the area information is not stored in the memory M2. Thus, it is possible to reduce the time required to prepare the narrow-area information and to effectively update the area information.

These modes are preferably switched by means of a switch 47 (see FIG. 1), which is manually operated by the pilot. Because it is preferably possible to avoid obstacles by switching the operation mode to the bad weather mode when the helicopter flies at a very low altitude even in fine weather.

The narrow-area information and the obstacle information are not always automatically updated, so that the final writing in the memories M2 and M3 may be carried out on the basis of the determination of the pilot.

The superimposing rate of the actual field of vision and the pseudo field of vision is so determined that the pilot can see both of the fields of vision in a proportion suited to the pilot's taste, and can monitor the operation state of the system by recognizing the superimposition of the actual field of vision and the pseudo field of vision. The pilot can suitably adjust the superimposing ratio or degree of the pseudo field of vision to the actual field of vision. As mentioned above, the display means 13 comprises, e.g., a liquid crystal display panel, the density or gradation of which can be adjusted by an input means 51, such as a variable resister. Thus, the superimposing ratio or degree of the pseudo field of vision to the actual field of vision can be adjusted as described above.

The pilot 11 always flies while searching a forced landing point. Therefore, according to the present invention, forced landing points are previously written in the pseudo field of vision, so that the pilot 11 feels at easy. The pilot 11 can recognize force landing points required particularly in bad weather. The engine of a helicopter is typically a single-engine or a twin-engine. The helicopter always prepares to safely land at a forced landing point by the autorotation when the engine is stopped. Therefore, the pilot always flies while recognizing forced landing points. If the forced landing available points are emphasized in the pseudo field of vision so as be easily recognized, it is possible to fly at its ease. This is required when the pilot's work load is high, e.g., in bad weather. In order to write a fixed obstacle information, such as forced landing points and high-voltage cables, on the map prepared by the above topography information, an obstacle information may be previously derived by the obstacle information arithmetic means 43b to be stored in the third memory by manually operating the stored input directing means 49.

While the HMD has been described as an example, the present invention should not be limited thereto, a large HUD may be provided in three directions.

According to the present invention, the pilot can see a clear three-dimensional image in the pseudo field of vision superimposed on the actual field of vision. Therefore, even in bad weather, the pilot can fly as if the pilot makes a visual flight, and it is not required to excessively descend to the vicinity of the ground, so that the pilot can safely fly in the wide field of vision and easily keep the balance. Moreover, since it is possible to fly on the visual flight conditions, it is possible to freely fly without being limited to a particular flight region. Since it is possible to see the pseudo field of vision superimposed on the actual field of vision, it is possible to recognize that the system is normally operating. Therefore, it is not required to provide a triple system, such as navigational instruments mounted on an ordinary aircraft, so that the costs are low and the system is light.

According to the present invention, in fine weather, the current topography information is always written by means of the laser radar to update the map, so that it is possible to fly at ease. In bad weather, it is possible to find obstacles by means of the laser radar and the millimeter wave radar, which is additionally used if necessary.

According to the present invention, the narrow-area information can be updated to be stored in the second memory as soon as possible, so that the narrow-area information can be almost always displayed on the display means.

According to the present invention, since it is possible to clearly display, e.g., forced landing points, by means of the stored input directing means, the pilot can cope with emergency, such as engine stop, while keeping quite cool.

According to the present invention, since the forced landing points, lift cables and so forth can be stored in the third memory as the obstacle information by a manual operation, the flight safety can be more insured.

In addition, according to the present invention, since it is possible to form the pseudo field of vision so that the pilot is easy to see the pseudo field of vision by changing the density of the display in the pseudo field of vision, it is possible to surely make a safe flight.

Moreover, according to the present invention, since the positions of other aircraft are clearly displayed in the pseudo field of vision, it is possible to prevent the aircraft from colliding with another aircraft in the sky.

All the above matters can solve the present problems on operation of rotor craft. Therefore, according to the system of the present invention, it is possible to considerably improve the usability of rotor craft, so that the present invention can considerably contribute to society. In addition, the present invention is useful for a small rotor craft which uses local airports. Moreover, the present invention can provide excellent advantages, such as high reliability, low costs and light weight.

In addition, the present invention is useful for a rotor craft, particularly a helicopter.

Moreover, according to the present invention, even in bad weather, it is possible to safely fly as if the pilot makes a visual flight as described above. The present invention may be also applied to the case where observers other than the pilot see the external world in the actual field of vise.

As described above, according to the present invention, it is possible to safely fly as if the pilot makes a visual flight, so that it is possible to obtain excellent advantages.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A flight system provided in an aircraft wherein a pilot sitting on a seat is capable of viewing the actual field of vision of the external world through a window, said flight system comprising:

display means, provided in front of eyes of the pilot, for displaying virtual images of the external world while allowing the pilot to see actual field of vision of the external world through the window;

a first memory for storing wide-area information, which includes latitude, longitude and altitude of a wide area corresponding to respective positions on a map;

a second memory for storing narrow-area information, which includes latitude, longitude and altitude of a narrow area narrower than said wide area, corresponding respective positions on the map;

a third memory for storing obstacle information, which includes latitude, longitude and altitude of an obstacle;

first detecting means for detecting latitude, longitude and altitude of the aircraft;

second detecting means for detecting the present position of said pilot and the posture of the front of a face of said pilot; and processing means, in response to the respective outputs of said first, second and third memories and said first and second detecting means, for reading said wide-area information, said narrow-area information and said obstacle information out of said first, second and third memories, and causing the latitude, longitude and altitude of said memories to coincide with each other to generate said virtual images and to display said virtual images on said display means so that the area and obstacle in said virtual images are superimposed on said area and obstacle in the actual field of vision viewed by said pilot through said display means.

2. A flight system as set forth in claim 1, which further comprises:

a laser radar;

narrow-area information arithmetic means for generating said narrow-area information on the basis of an output of said laser radar to store the generated narrow-area information in said second memory; and obstacle information arithmetic means for generating said obstacle information on the basis of the output of said laser radar to store the generated obstacle information in said third memory.

3. A flight system as set forth in claim 2, wherein said laser radar irradiates laser beams in a substantially downward direction to obtain said narrow-area information, and irradiates laser beams in a substantially forward and horizontal direction to obtain said obstacle information.

4. A flight system as set forth in claim 2, which further comprises:

a millimeter wave radar, and wherein said obstacle information arithmetic means generates said obstacle information on the basis of outputs of said laser radar and said millimeter wave radar to store the generated obstacle information in said third memory.

5. A flight system as set forth in claim 4, wherein said millimeter wave radar irradiates electromagnetic wave beams in a substantially forward and horizontal direction to obtain said obstacle information.

6. A flight system as set forth in claim 2, which further comprises:

means for discriminating whether said narrow-area information generated by said narrow-area information arithmetic means is different from said narrow-area information stored in said second memory, with respect to the same position, wherein said narrow-area information arithmetic means updates the generated narrow-area information to store the updated narrow-area information in said second memory.

7. A flight system as set forth in claim 2, which further comprises:

stored input making means for making said narrow-area information of said narrow-area information arithmetic means to be stored in said second memory by a manual operation.

8. A flight system as set forth in claim 7, wherein said stored input making means makes said obstacle information of said obstacle information arithmetic means to be stored in said third memory by a manual operation.

9. A flight system as set forth in claim 1, wherein said display means is capable of changing a density of said virtual images.

10. A flight system as set forth in claim 1, which further comprises receiving means for receiving a radio signal representative of latitude, longitude and altitude of a flying object, wherein said processing means calculates an output of said receiving means and causes said display means to display thereon a character representative of an image of said flying object in said virtual images on the basis of said output of said receiving means so that said character is superimposed on said flying object in the actual field of vision.

11. A flight system as set forth in claim 1, wherein said aircraft is a rotor craft.

12. A system for forming virtual images for an aircraft, said system comprising:

a first memory for storing wide-area information, which includes latitude, longitude and altitude of a wide area corresponding to respective positions on a map;

a second memory for storing narrow-area information, which includes latitude, longitude and altitude of a narrow area narrower than said wide area, corresponding respective positions on the map;

a third memory for storing obstacle information, which includes latitude, longitude and altitude of an obstacle;

display means for displaying the virtual images of the external world while allowing an observer to see the actual field of vision through said display means;

detecting means for detecting the present position of said observer and the posture of the front of a face of said observer; and processing means, in response to the respective outputs of said first, second and third memories and said detecting means, for reading said wide-area information, said narrow-area information and said obstacle information out of said first, second and third memories, and causing the latitude, longitude and altitude of said memories to coincide with each other to generate said virtual images and to display said virtual images on said display means so that the area and obstacle in said virtual images are superimposed on said area and obstacle in the actual field of vision viewed by said observer through said display means.

* * * * *